Feb. 15, 1938.　　　　F. W. SCHARF　　　　2,108,298
ELECTRIC COOKING APPLIANCE
Filed Dec. 19, 1935　　　　2 Sheets-Sheet 1
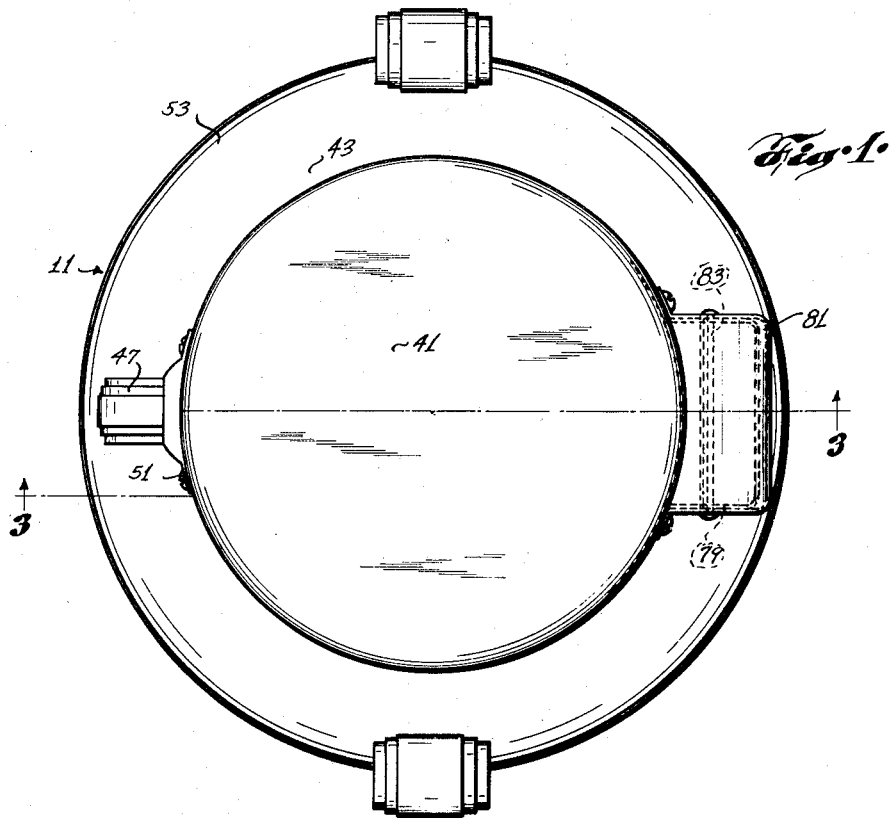
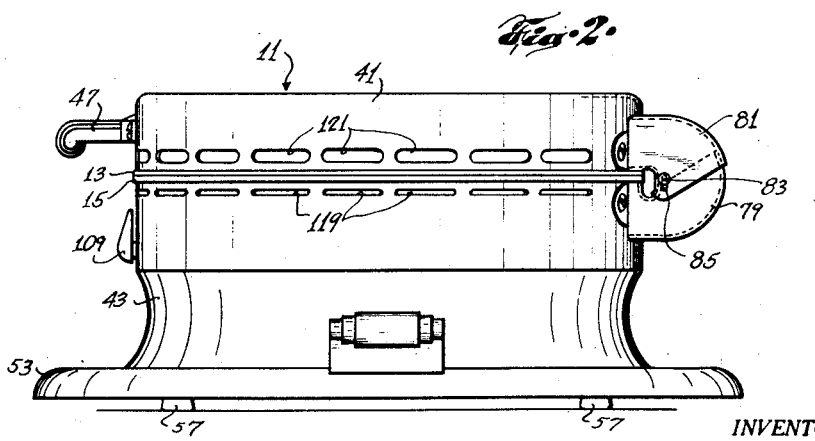
INVENTOR.
FRANK W. SCHARF
BY Roy M. Eilers
ATTORNEY.

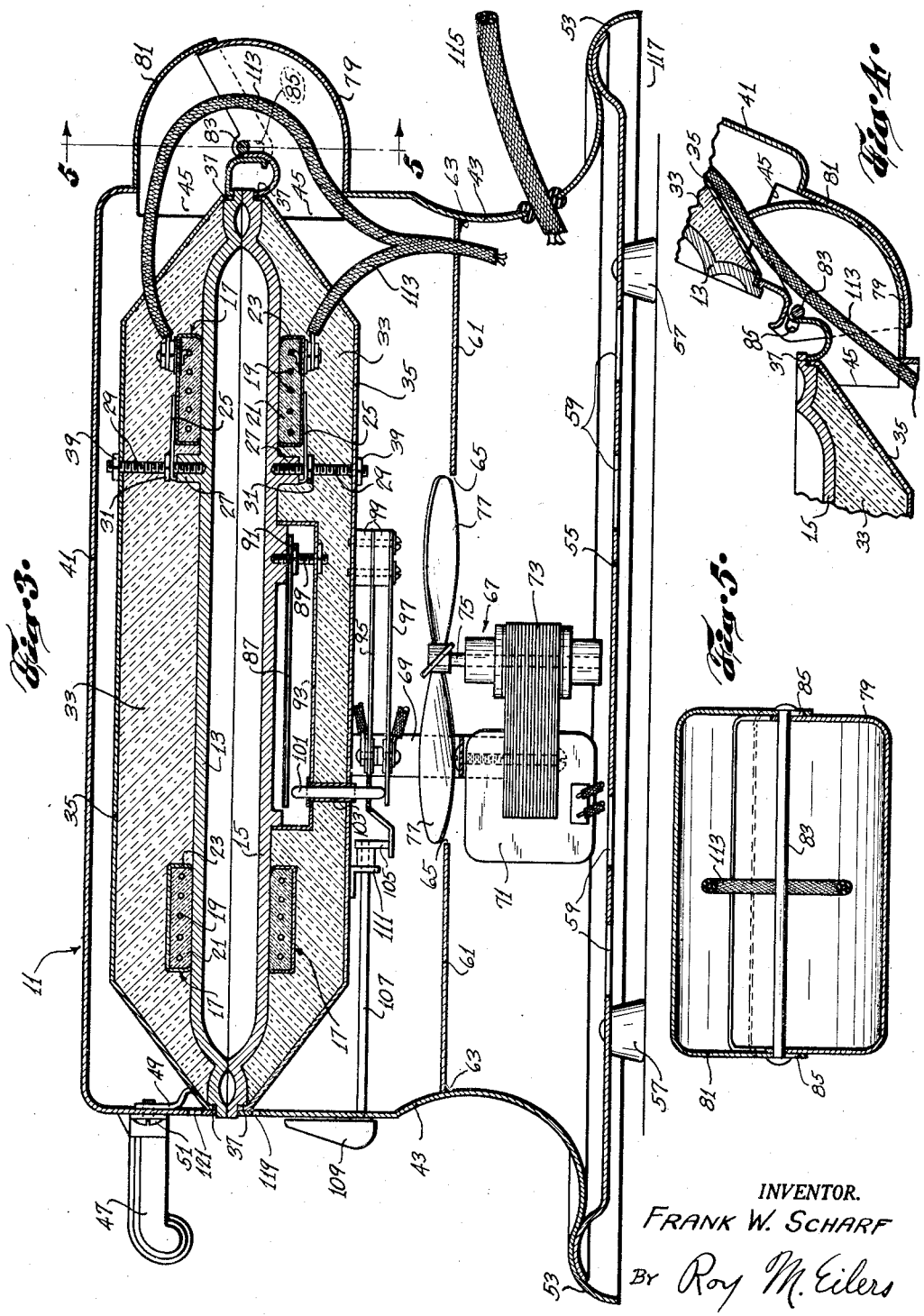

Patented Feb. 15, 1938

2,108,298

UNITED STATES PATENT OFFICE 2,108,298

ELECTRIC COOKING APPLIANCE

Frank W. Scharf, Western Springs, Ill., assignor to McGraw Electric Company, Chicago, Ill., a corporation of Delaware Application December 19, 1935, Serial No. 55,184

20 Claims. (Cl. 219—19)

My invention relates to electric cooking appliances and particularly to waffle irons, toasters, and other electric cooking appliances having an outer casing spaced from an enclosed heating element.

An object of my invention is to provide an electrically heated cooking appliance having means to cool its external surface by a current of confined cooling fluid flowing in a certain path.

Another object of my invention is to provide a waffle iron, toaster or other electric cooking device embodying external casings and a hinge structure constituting an air conduit surrounding substantially the entire outer surface of the device and having an air moving means located in the conduit.

Another object of my invention is to provide means associated with a waffle iron or toaster to effect cooling of its external shell portions in all positions of the two heated surfaces of the device.

Another object of my invention is to provide an automatically thermally controlled cooking device in which the temperature of the switch and of its contacts is maintained at a relatively low value.

Other objects of my invention will either be pointed out particularly in the course of a description of one form of device embodying my invention, or will be evident from such description.

In practicing my invention I provide one or more pairs of co-operating heating or baking surfaces, electric heating elements closely operatively associated with the respective baking surfaces, heat insulating material located against the outer surfaces of the respective heating surfaces or grids, and sheet-like inner covers for the heat insulating material. I provide further external casings spaced from the hereinbefore mentioned cover members, each of said casings being provided with a relatively large opening over which is located a substantially air tight hinge structure suitably secured to the respective casings to permit parallel-face relative movement of the grids as well as to permit relative angular adjustment of the grids and casings.

The lower external casing may constitute also a support for the entire structure and may have located therein an air moving device, such as a motor driven fan effective to draw air into the lower casing at a predetermined point or place and force part of the air thus drawn in, out of the casing at other points therearound, a part of the indrawn air being forced through the hollow hinge structure and into the upper external casing and out of the same at predetermined openings therein. I may locate the motor driven fan anywhere in the path of the cooling fluid and I may also use a motor driven fan in each casing.

I provide also a thermally controlled switch for the circuit of the heating elements associated with the grids comprising in one form a thermal element closely associated with the lower grid and actuating a control switch which is mounted adjacent to the air moving device so as to be subjected to the cooling effect of the incoming cooling fluid.

The inventive concept may be used also with various other electric cooking appliances in which one or more pairs of electric heating elements are used together with inner covers and an outer casing or casings therefor, located adjacent the outer faces of the heating elements which casings are spaced from the inner covers to form conduits for the cooling fluid, which conduits are connected at one edge or at one point at one edge by walls forming a connecting conduit.

In the drawings,

Figure 1 is a top plan view of a waffle iron or sandwich toaster embodying my invention, Fig. 2 is a view in side elevation thereof, Fig. 3 is a view in vertical section therethrough, taken on the line 3—3 of Fig. 1, Fig. 4 is a fragmentary sectional view showing the relative position of the two parts of the hinge structure, when the two casings have been moved to open position and Fig. 5 is a fragmentary sectional view through the hinge structure, taken on the line 5—5 of Fig. 3.

A waffle iron or sandwich toaster, designated in its entirety by the numeral 11, may comprise an upper grid or baking surface 13 and a lower grid or baking surface 15. I have indicated the inner surface of these respective grids generally only as the configuration thereof constitutes no part of my present invention and may be either of the kind usually supplied for waffle irons or may be flat as when these grids or baking or heating surfaces are to be used in connection with sandwich toasters.

Electric heating elements 17 are closely operatively associated with the respective outer surfaces of the grids 13 and 15 and here again I have indicated these generally only since they constitute no part of my present invention. Thus a plurality of resistor wires 19 may be embedded in a refractory cement 21 partially enclosed in a metal member 23 of channel shape in lateral section and while I have illustrated and described a specific form of electric heating element, I do not desire to be limited thereto since any suitable or desired electric heating element may be utilized by me. Means for clamping the heating elements 17 against the outer faces of the respective grids is indicated by a clamping bar 25 of which a suitable number are provided, having one end portion located over a lug 27 which may be integral with the grid and having its other end portion located against the member 23. A clamping bolt 29 extends into the lug and a nut 31 is screwed thereon and against the outer face of clamping bar 25.

As it is desired to concentrate the heat generated in the heating resistor 19 to as great an extent as may be possible against the grids, I provide heat insulating material 33 located against each of the outer surfaces of the grids 13 and 15 and over the respective heating elements, and I may provide a thin sheet-like cover 35 which may be of dished shape, to retain the heat insulating material 33 in its proper operative position. As shown more particularly in Fig. 3 of the drawings, the outer peripheral edge of the dished covers 35 fit against an annular shoulder portion 37 provided on the respective grids and the cover members may be held in their proper operative positions by nuts 39 mounted on the outer end of the screw threaded clamping studs 29 which are made long enough to extend through suitable openings provided for that purpose in the covers 35. While I have shown the covers 35 as being made of metal, I do not desire to be limited thereto since it is within the province of my invention to make these covers of as thin sheet-like heat-insulating material as may be possible while still providing sufficient mechanical strength for the desired purposes and operating conditions to which the device will be subjected.

Outer casing members 41 and 43 are provided for the respective upper and lower grid assemblies hereinbefore described. The upper external casing 41 may be of relatively deep dish shape and of such contour as will cooperate with the grids and the inner cover member 35. The casing 41 is provided with a relatively large opening 45 at that part thereof which normally constitutes the rear portion thereof and a handle 47 is secured to the casing on the outside and at the front thereof to permit of manually actuating the upper grid assembly.

Means for holding the outer casing in its proper operative position are provided in the form of punched-out portions 49 integral with inner cover 35, shown more particularly at the left-hand side of Fig. 3 of the drawings, a suitable number thereof being provided spaced peripherally of the cover 35. The same screws 51 holding the handle 47 against the outer casing 41 may also hold the outer ends of the punched-out portions against the inside of casing 41, it being understood that the construction is such that when the screws 51 extend through either the handle 47 or through the casing 41, the casing will be held tightly in its proper operative position.

The lower casing 43, as shown more particularly in Fig. 3 of the drawings, is of substantially annular shape in its upper portion and may have a lower outwardly extending flange 53 which may constitute the lower-most part thereof, it being understood that the shape of the lower casing 43 is of pleasing ornamental effect. The lower end of casing 43 has located therein a bottom plate 55 having a plurality of heat insulating feet 57 secured thereto and it is to be noted that the plate 55 is provided with a plurality of air inlet openings 59. An inner baffle-plate 61 is suitably secured to the casing 43 as by small welds 63, or in any other suitable manner, and this plate has a relatively large opening 65 therein.

An air moving device in the form of a motor driven fan 67 may be suspended by a bracket 69 from the lower cover 35 and includes a field winding 71, a stator structure 73, a rotor indicated generally by the rotor shaft 75, and a fan blade assembly 77 mounted on the rotor shaft 75. I have indicated this motor structure generally only since it is obvious that any suitable or desired construction of such device suitable for my purpose can be employed and that where direct current only is available, a direct current motor must be employed, while where alternating current energy is available, any form of alternating current motor may be used.

Means for pivotally connecting the lower and the upper grid and casing structures is provided in the form of a substantially air tight hinge structure comprising a lower hinge element 79 and an upper hinge element 81, element or portion 79 being suitably secured over an opening 45 in the lower casing and portion 81 of the hinge structure being suitably secured to the upper casing 41 over an opening 45. A hinge pin 83 connects the two portions of the hinge structure which are of such shape and design as to provide a substantially air tight path for cooling air between the lower and the upper casing in substantially all relative positions of the grids 13 and 15. Thus in order to permit of parallel-face relative movement of the two grids, upper hinge portion 81 is provided with an elongated slot 85 in which the hinge pin 83 may move when relative parallel-face adjustment of the grids becomes necessary.

Thermally actuable means for controlling the energization of the heating elements 17 may comprise a bimetal bar 87 having one end thereof suitably tightly clamped against an integral portion of the lower grid 15 at its outer face as by a stud 89 and a nut 91 thereon. This bimetal element may be covered by a small dished casing 93 in order that the heat insulating material 33 may not engage the bimetal bar.

A circuit controlling switch for the heating element 17 may include a pair of switch arms 95 and 97 having cooperating contact members mounted thereon at one end of the respective spring bars while the other ends are tightly clamped together by blocks 99 of electric-insulating material and against the outer face of lower cover 35, substantially as shown in Fig. 3 of the drawings.

The movement of the bimetal bar 87 when heated, is in a substantially downward direction and is adapted to move an actuating rod 101 freely movable in a tubular member 103 which may be held in proper operative position by the dished member 93. The other end of rod 101 may engage the movable end of spring contact bar 97 to cause it to disengage the other spring contact bar 95.

Means for adjusting the switch to vary the temperature at which deenergization of the heating elements is effected may comprise a cam 105 fixed on a shaft 107 having one portion extending outwardly through casing 43 at the front thereof and having an actuating knob 109 mounted thereon. The inner end of shaft 107 may be supported in any suitable manner as indicated by a bracket 111.

I have indicated electric conductors 113 as extending from terminal members on the respective heating elements 17 and through the hollow hinge structure hereinbefore described, and while I have not shown a complete diagram of connections of the heating elements, the circuit controlling switch and the motor, it is to be understood that such connections are used as will cause the motor 67 to be energized as soon as the twin conductor cord 115 is connected through the ordinary plug to a supply of electric energy and that the heating elements 17 are likewise energized as long as the switch bars 95 and 97 are in engagement and that the heating elements 17 are deenergized when the temperature of the grids and particularly of the bimetal bar 87 exceeds a predetermined adjustable value, all in a manner now well known in the art.

Let it be assumed that an operator desires to use the waffle iron, he will, as has already been stated, effect energization by connecting the cord 115 to a suitable source of supply, so that the heating elements 17 will be energized and will be heated up. The air moving device 67 is immediately effective to draw air in through the annular space 117 below the bottom of the lower casing 43 through the openings 59 in the bottom plate 55 and through the opening 65 in the baffle-plate 61. From there a part of the indrawn air is distributed substantially uniformly in the air conduit provided between the baffle-plate 61 and the lower inner cover 35 and this air is forced outwardly through a plurality of openings 119 provided in the lower casing 43 closely adjacent its upper edge so that the cooling air will engage substantially the entire outer surface of the lower cover 35.

A part of the indrawn cooling air will be forced into, through and out of the substantially air tight hollow hinge structure and into the upper outer casing 41 between it and the cover 35 and outwardly through a plurality of openings 121 provided in the outer casing 41 adjacent its edge. It is to be noted that the openings 119 are distributed substantially uniformly peripherally of the lower casing and that they are somewhat smaller than the upper openings 121. This is for the reason that the pressure in the lower air conduit is slightly greater than in the upper portion of the air conduit and I desire, of course, that substantially the same amount of cooling fluid shall be available for the bottom as well as for the upper portion of the electric cooking appliance. It is to be noted that by conduit I refer particularly to the space in the lower casing outsid of the lower cover 35, to the hollow hinge structure and to the space between the upper outer casing 41 and the upper cover member 35. By the hereinbefore described construction I provide an air conduit surrounding substantially the entire outer peripheral surface of the two-part cooking appliance and a connecting portion at one point of the periphery and I provide further an air moving device which is effective to cause cooling fluid to move into, through and out of said conduit in all operative positions of the two portions of the cooking appliance relatively to each other.

I wish to point out further that the switch controlling the energization of the heating elements is affected by the incoming stream of cooling air first of all since it is placed substantially directly above the motor driven fan so that air moved by the fan will first engage the switch members before it comes in contact with any other part of the cooking appliance structure.

The device embodying my invention provides a relatively cool-surface cooking appliance, whereby the danger of an operator burning his finger or hand while using the device is entirely eliminated. As has already been stated my invention is not limited to the particular device shown but is applicable to all similar electric cooking appliances having a pair of spaced extended electric heating elements, a pair of inner covers and a pair of outer casings therefor.

While I have illustrated and described a particular device embodying my invention, I do not desire to be limited thereto since it is obvious that various changes may be made within the scope of the appended claims.

I claim as my invention:

1. In a cooking appliance, the combination with a pair of cooking surfaces, electric heating elements adjacent one face of the respective cooking surfaces and covers over the respective heating elements at said one face, of an outer casing outside of each cover and spaced therefrom, a substantially air-tight hollow hinge structure pivotally connecting said casings and an air-moving means in one of said casings to cause air to move into and out of the space between the covers and the outer casings.

2. A cooking appliance assembly comprising a pair of opposed cooking grids, heating elements adjacent the respective grids, a double-wall conduit including a hollow hinge structure for the grids substantially entirely surrounding the assembly, air inlets and air outlets in certain walls of the conduit and air moving means in said conduit.

3. A cooking appliance assembly comprising a pair of opposed grids, a heating element for each grid, heat-insulating material over the heating element and the outside of each grid, a cover for the heat-insulating material, an outer casing for each grid spaced from the respective covers having openings therein, a substantially air-tight hollow hinge structure secured to said casings and an air-moving device in one of said casings adapted to force air into the space between the respective covers and adjacent casings in all relative positions of the grids relative to each other.

4. A cooking appliance comprising a pair of opposed cooperating heated cooking grids, a hollow hinge structure operatively secured to the grids to effect relative movement of the grids and means including outer casings, said hinge structure and a motor driven fan in one of said casings for surrounding substantially the entire outer surface of the grids with a cooling fluid moving in a confined definite path irrespective of the relative position of the grids.

5. A cooking appliance comprising an upper and a lower heated grid, a double-wall casing for the upper grid, a plural-wall casing for the lower grid, a hollow hinge structure secured to the respective casings, an air inlet opening in one wall of the lower casing, air outlet openings in another wall of the lower casing and in one wall of the upper casing and an air-moving device adjacent said air inlet opening in the lower casing for moving air into and out of the lower casing and also through the hinge structure into and out of the upper casing.

6. A device as set forth in claim 5 in which the air outlet openings in the respective casings are located adjacent to the grids.

7. A device as set forth in claim 5 in which the air outlet openings extend around the periphery of the casings and are located adjacent to the grids.

8. A device as set forth in claim 5 in which the air outlet openings in the lower casing are smaller than the air outlet openings in the upper casing.

9. A device as set forth in claim 5 and including a thermally-actuable control switch supported by one wall of the lower casing adjacent to the air moving device and in its air stream.

10. A cooking appliance comprising a pair of opposed grids, electric heating elements adjacent the outside surfaces of the respective grids, heat-insulating material adjacent the outer surfaces of the grids and the heating elements, thin-sheet covers over the heat-insulating material for each grid, an outer casing for each grid and its cover and spaced from the cover, a hollow substantially air-tight hinge structure secured to the respective outer casings over openings therein and a motor driven fan in the lower outer casing for forcing air into the space between the respective outer casings and the adjacent thin-sheet covers.

11. A device as set forth in claim 10 in which the air tight hollow hinge structure remains substantially air tight when the grids are located in separate parallel-face positions relatively to each other.

12. In a waffle iron or the like, the combination with a pair of opposed grids, electric heating elements located adjacent to the outside surface of the respective grids, covers for the respective heating elements spaced therefrom, outer dished casings for the respective grids and covers, spaced from the covers, an opening in each outer casing at one point on its periphery, a plurality of peripherally-spaced openings in each casing adjacent its edge, a substantially air-tight hollow hinge structure secured to the respective casings over the first mentioned opening therein, said hinge structure remaining air tight irrespective of relative parallel-face separating and angular movements of the grids and a motor driven fan in one of said casings for effecting movement of cooling air into and out of said one casing and also through the hinge structure into and out of the other casing.

13. An appliance as set forth in claim 10 in which the two grids are normally located in superposed position relatively to each other and in which the motor driven fan is located in the lower casing.

14. A cooking appliance comprising an upper and a lower heated grid, a double-wall casing outside the upper grid, a plural-wall casing below the lower grid, a hollow hinge structure secured to the respective casings, an air inlet in one wall of the lower casing, air outlet openings in another wall of the lower casing and in one wall of the upper casing and a motor driven fan in one of said casings for moving air into and out of one of said casings, through the hinge structure and into and out of the other casing.

15. A cooking appliance assembly comprising a pair of opposed cooking grids movable relatively to each other, heating elements adjacent to the outside surfaces of the respective grids, outer casings cooperating with the grids to define air conduits outside of the respective grids, a conduit structure secured to said casings and connecting said air conduits and adapted to remain substantially air-tight in all relative positions of said grids and a motor driven fan in one of said outer casings adapted to draw cooling air into said one casing and force it out of both casings to cool the same.

16. A cooking appliance comprising a pair of opposed cooperating cooking grids adapted to be movable relatively to each other, electric heating means for the respective grids at the outside surfaces thereof, outer casings covering the respective heating means and spaced therefrom, a hollow substantially air-tight structure connecting the outer casings and a motor driven fan in one of said casings adapted to draw cooling air into said one casing and force it out of both casings in a definite path defined at least in part by the outer casings and the hollow structure, said definite path being maintained irrespective of the relative positions of the grids.

17. An electric cooking appliance comprising a pair of spaced parallel-extending electric heating elements movable relative to each other, inner covers located adjacent to the outer surfaces of the respective heating elements, outer casings spaced from the outer surfaces of the respective inner covers and adapted to cooperate therewith to constitute air conduits, a hollow structure secured to the casings and connecting said conduits and adapted to remain substantially air-tight irrespective of the relative positions of the electric heating elements and a motor driven fan in one of said casings adapted to draw air into said one casing and force it out of both casings to cool said outer casings.

18. An electric cooking appliance comprising a pair of spaced parallel-extending electric heating elements movable relative to each other, inner covers located adjacent to the outer surfaces of the respective heating elements, outer casings spaced from the outer surfaces of the respective inner covers and adapted to cooperate therewith to constitute air conduits, a hollow structure secured to the casings and connecting said conduits and adapted to remain substantially air-tight irrespective of the relative positions of the electric heating elements and a motor driven fan in one of said casings adapted to draw air into said one casing and force substantially the same amount of cooling air out of each of said casings to cool them.

19. An electric cooking appliance including a pair of spaced parallel-extending electric heating elements adapted to be moved relatively to each other, an air chamber adjacent the outer face of the respective heating elements constituted by cooperating inner and outer walls, said outer walls having openings therein at certain points, an auxiliary air chamber constituted by a plurality of interfitting walls operatively engaging said outer walls and communicating with said first mentioned air chamber and adapted to remain substantially air-tight irrespective of the relative positions of said heating elements and a motor driven fan in one of said chambers and adapted to draw air into said one chamber and force it out of both chambers to cool the outer walls.

20. An electric cooking appliance including a pair of spaced parallel-extending electric heating elements adapted to be moved relatively to each other, an air chamber adjacent the outer face of the respective heating elements constituted by cooperating inner and outer walls, said outer walls having openings therein at certain points, an auxiliary air chamber constituted by a plurality of interfitting walls operatively engaging said outer walls and communicating with said first mentioned air chambers and adapted to remain substantially air-tight irrespective of the relative positions of said heating elements and a motor driven fan in one of said chambers and adapted to draw air into said one chamber and cause substantially equal amounts thereof to flow out of the respective chambers to cool the outer walls.

FRANK W. SCHARF.